United States Patent [19]

Gerard

[11] 3,840,825

[45] Oct. 8, 1974

[54] COMPOSITE ACOUSTIC SURFACE WAVE DEVICES WITH BRIDGE-LIKE COUPLING FILM

[75] Inventor: Henry M. Gerard, Manhattan Beach, Calif.

[73] Assignee: Hughes Aircraft Company, Culver City, Calif.

[22] Filed: Aug. 3, 1973

[21] Appl. No.: 385,496

[52] U.S. Cl. .................. 333/30 R, 310/8.3, 310/9.8, 333/72

[51] Int. Cl. .......................... H03h 9/26, H03h 9/30

[58] Field of Search ............. 333/30 R, 72; 310/8.1, 310/8, 8.2, 8.3, 8.4, 8.5, 8.6, 9.7, 9.8

[56] References Cited

UNITED STATES PATENTS

| | | | |
|---|---|---|---|
| 3,435,381 | 3/1969 | Tournois | 333/30 R |
| 3,464,033 | 8/1969 | Tournois | 333/30 R |
| 3,665,225 | 5/1972 | Van Heuvel et al. | 333/72 X |
| 3,684,970 | 8/1972 | Wang | 330/5.5 |
| 3,760,204 | 9/1973 | Yester, Jr. | 310/8.2 |

*Primary Examiner*—James W. Lawrence
*Assistant Examiner*—Marvin Nussbaum
*Attorney, Agent, or Firm*—W. H. MacAllister; Paul M. Coble

[57] ABSTRACT

Arrangements are disclosed for efficiently transmitting acoustic surface wave energy across an interface between different elements of acoustic surface wave propagating material as well as over a discontinuity in an acoustic surface wave propagating substrate. An acoustic wave-guiding film spans the interface between a pair of slabs of acoustic surface wave propagating material (or a surface discontinuity in a single substrate) and overlies an adjacent surface portion of each slab. The wave-guiding film has tapered end portions of a thickness which decreases as a function of distance from the slab interface. Also disclosed is an acoustic surface wave delay line having transducer-supporting pads of a piezoelectric material acoustically coupled to respective ends of an elongated strip of a relatively temperature insensitive material capable of propagating acoustic surface waves.

15 Claims, 5 Drawing Figures

COMPOSITE ACOUSTIC SURFACE WAVE DEVICES WITH BRIDGE-LIKE COUPLING FILM

This invention relates generally to microwave acoustics, and more particularly relates to a coupling arrangement for efficiently transferring acoustic surface wave energy between wave propagating portions of an acoustic surface wave device.

In recent years there has been increased interest in acoustic surface wave devices. One reason for this is that acoustic surface waves travel considerably slower than do electromagnetic waves in free space. Hence, the wavelengths in question are shorter, and components such as delay lines, amplifiers, attenuators, and filters may be implemented using microminiature construction techniques.

Basically, an acoustic surface wave circuit comprises a source of rf signals, a smooth slab-like element or substrate of a material capable of propagating acoustic surface waves, and a load or utilization device. Electro-acoustic transducers are attached or held in close proximity to the substrate to convert the rf energy to acoustic surface waves in the substrate and vice versa.

In order to achieve efficient conversion of rf energy into acoustic surface waves, the device substrates are usually formed from piezoelectric materials (such as $LiNbO_3$ and ZnO) since such materials provide a relatively large mechanical deflection in response to a given applied voltage. However, the acoustic surface wave propagation velocity in these materials is relatively sensitive to temperature. Hence, significant variations in delay may occur as a result of temperature changes when such materials are used to provide acoustic surface wave propagation paths. While non-piezoelectric (or weakly piezoelectric) materials capable of propagating acoustic surface waves (such as isopaustic glass or ST-cut quartz, respectively) are substantially less sensitive to temperature, such materials do not provide efficient conversion between rf and acoustic surface wave energy.

By utilizing a composite structure wherein a strong piezoelectric material (such as $LiNbO_3$) is employed in the electro-acoustic transducer portion and a temperature insensitive material (such as ST-cut quartz) is used in the acoustic surface wave propagating portion, it is possible, in principle, to obtain an improved acoustic surface wave device which simultaneously achieves both efficient rf-to-surface wave conversion and temperature insensitive delay. However, the realization of an optimum composite acoustic surface wave device heretofore has been prevented by the inability to achieve efficient transmission of acoustic surface waves across the interface between the two constituent materials.

Accordingly, it is an object of the present invention to provide an arrangement for efficiently coupling acoustic surface wave energy between adjacent bodies of acoustic surface wave propagating material.

It is a further object of the present invention to provide an arrangement for transmitting acoustic surface wave energy across an interface between different elements of acoustic surface wave propagating material with minimum loss and reflection of acoustic energy.

It is a still further object of the invention to provide an acoustic surface wave coupler for transferring acoustic surface wave energy between a pair of end-to-end joined wave propagating elements in a manner independent of the quality of the joint between these elements.

It is yet another object of the invention to provide an arrangement for efficiently transmitting acoustic surface wave energy over a discontinuity in an acoustic surface wave propagating substrate.

It is a still further object of the invention to provide a composite acoustic surface wave structure comprising a plurality of elements of different acoustic wave propagating material efficiently acoustically coupled to one another, thereby enabling the realization of a composite acoustic surface wave device wherein respective constituent portions are designed to optimize a different performance parameter.

An arrangement according to the invention includes an element of a material capable of propagating acoustic surface wave energy and having an acoustic wave propagating surface defining a discontinuity therein. An acoustic wave-guiding film overlies the discontinuity and an adjacent portion of the wave propagating surface. When the arrangement is employed to couple acoustic energy between a pair of acoustic surface wave propagating elements, the acoustic wave-guiding film overlies the interface between the elements and a portion of the acoustic wave propagating surface of each element.

Additional objects, advantages and characteristic features of the present invention will become apparent from the following detailed description of preferred embodiments of the invention when considered in conjunction with the accompanying drawing wherein.

Figure 1:
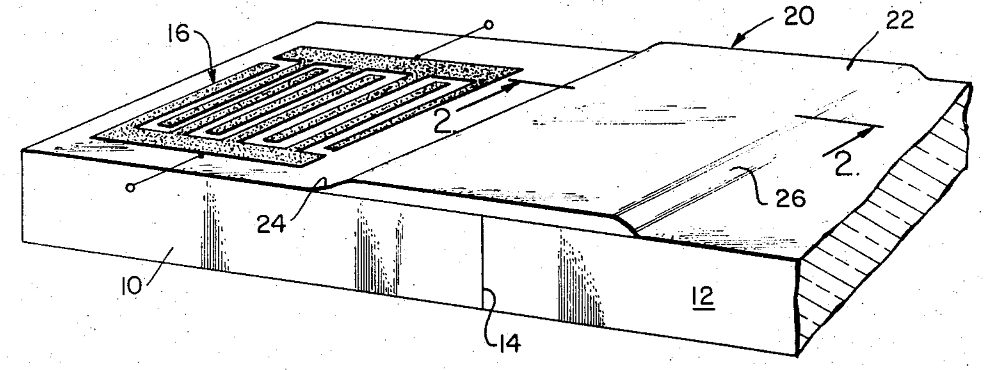
FIG. 1 is a perspective view illustrating a portion of a composite acoustic surface wave device in accordance with one embodiment of the invention.
Figure 2:
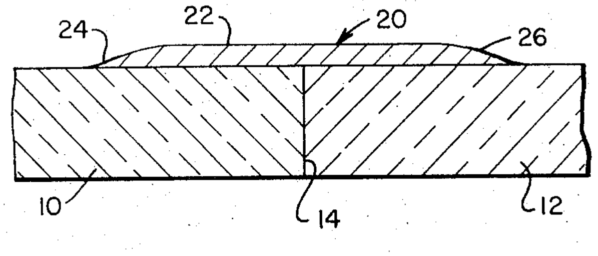
FIG. 2 is a longitudinal sectional view of a portion of the device of FIG. 1 as taken along line 2—2.

Referring to FIGS. 1 and 2 with greater particularity, a composite acoustic surface wave device according to the invention is shown to include first and second substrates, or slabs, 10 and 12 disposed in end-to-end relationship and joined to one another at a common interface 14. The slab 10 should be capable of propagating acoustic surface waves and is preferably of a piezoelectric material such as $LiNbO_3$, CdS, ZnO, $Bi_{12}GeO_{20}$ and $SiO_2$. The slab 12 may be of any material capable of propagating acoustic surface waves; this material is selected according to particular application and performance requirements of the device and may include semiconductor material, optic material, magnetic material, etc. As a specific example, for an acoustic surface wave delay line designed to provide a delay which is relatively insensitive to temperature, the slab 12 may be of ST-cut quartz. The interface joint 14 between the slabs 10 and 12 is not critical and may comprise any conventional bonding agent such as epoxy resin.

In order to convert input rf signals to acoustic surface waves in the slab 10 (or alternatively convert surface waves in the slab 10 into output rf signals), a conventional electro-acoustic transducer 16 is disposed on the surface of the slab 10 adapted to propagate the acoustic surface waves. Generally, this surface is ground and polished to an optical quality finish in order to reduce surface imperfections to a minimum and thereby minimize insertion losses.

In accordance with the principles of the invention, in order to transfer acoustic surface waves propagating along the slab 10 to the adjacent slab 12, an acoustic wave-guiding film 20 is deposited on the neighboring wave propagating surface portions of the respective slabs 10 and 12 in a manner spanning the interface 14. The material of the film 20 is preferably chosen such that the acoustic wave velocity in the film 20 is slower than the slowest acoustic surface wave velocity in either of the slabs 10 or 12. As a specific example, when the slab 10 is of $LiNbO_3$ and the slab 12 is of ST-cut quartz, the material for the film 20 may be gold, aluminum or nickel.

The acoustic wave-guiding film 20 is preferably constructed with a central portion 22 of substantially constant thickness overlying the interface 14 and tapered end portions 24 and 26 overlying respective surface portions of the slabs 10 and 12. In order to ensure that most of the acoustic surface wave energy is transferred to the film 20, the film thickness in the region adjacent the interface 14 should be not less than about one-half wavelength for the longest wavelength acoustic surface waves to be processed in the device. The length of the film 20 (i.e., its extent along a direction perpendicular to the interface 14) need only be sufficient to span the interface 14 and to permit a sufficiently gradual taper to enable efficient transfer of energy between the film 20 and the slabs 10 and 12. Such a taper is normally achieved by making the length (i.e., extent along the direction of taper) of each tapered portion 24 and 26 at least about twenty wavelengths for the longest wavelength acoustic surface waves to be processed. For ease of fabrication, however, it is preferable to make the overall length of the film 20 a few hundred wavelengths for such acoustic surface waves.

In the operation of the device of FIGS. 1 and 2, acoustic surface waves launched by transducer 16 propagate along the surface of slab 10 toward the interface 14. When these acoustic surface waves reach tapered portion 24 of the film 20 they launch corresponding acoustic waves in the film 20 which are guided along the film 20 in the same direction as the original acoustic surface waves. These acoustic waves pass over the interface 14 via the film 20 and, upon traversing tapered portion 26, launch corresponding acoustic surface waves in slab 12 which propagate along the surface of slab 12 in the same direction as the original acoustic surface waves propagating along slab 10. Since the conversion of acoustic surface waves in slab 10 into acoustic waves in the film 20 and back into surface waves in slab 12 occurs with minimum energy loss and wave reflection, and since substantially all of the acoustic energy traverses the interface 14 via the film 20, efficient transfer of acoustic surface wave energy is achieved between the slabs 10 and 12 despite the interface 14 therebetween. This enables the realization of composite acoustic surface wave structures wherein different portions of the structure are made of different materials selected to optimize respective performance parameters.

Figure 3:
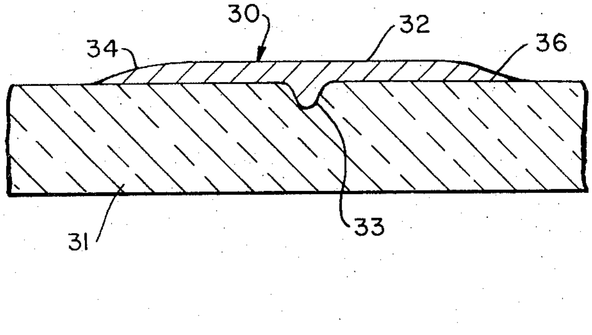
FIG. 3 is a sectional view similar to FIG. 2 illustrating a portion of an acoustic surface wave structure according to another embodiment of the invention.

In addition to transmitting acoustic surface wave energy over an interface between bodies of different acoustic surface wave propagating material, a coupling arrangement according to the invention may also be employed to transmit acoustic surface waves over a discontinuity in the wave propagating surface of a single substrate. In an arrangement of this type (illustrated in FIG. 3) substrate 31, which may be of any of the aforementioned acoustic surface wave propagating materials, may be seen to have a surface discontinuity in the form of a defect 33. An acoustic wave-guiding film 30 is deposited over the defect 33 and the surrounding regions of the surface of substrate 31. The film 30 is similar to the film 20 of FIGS. 1–2 and has central portion 32 and tapered end portions 34 and 36 corresponding to respective portions 22, 24 and 26 of the film 20. The construction of the film 30 (including film materials and dimensions) may be the same as that described above for the film 20. Operation of the arrangement of FIG. 3 to efficiently transmit acoustic surface wave energy over defect 33 corresponds to that described above for the embodiment of FIGS. 1–2 wherein acoustic surface wave energy is transmitted over interface 14.

Figure 4:
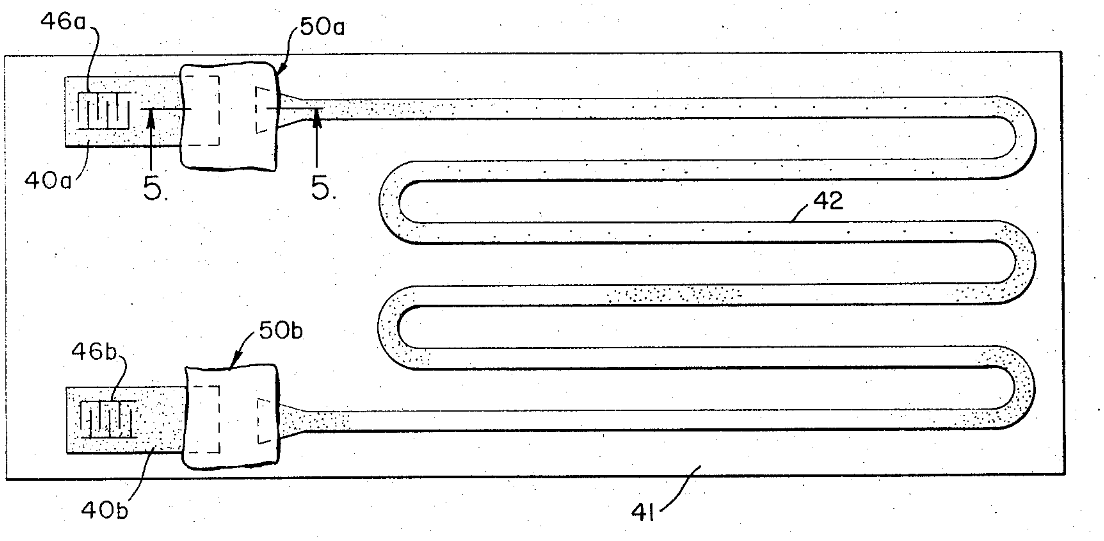
FIG. 4 is a plan view showing an acoustic surface wave device according to a still further embodiment of the invention.
Figure 5:
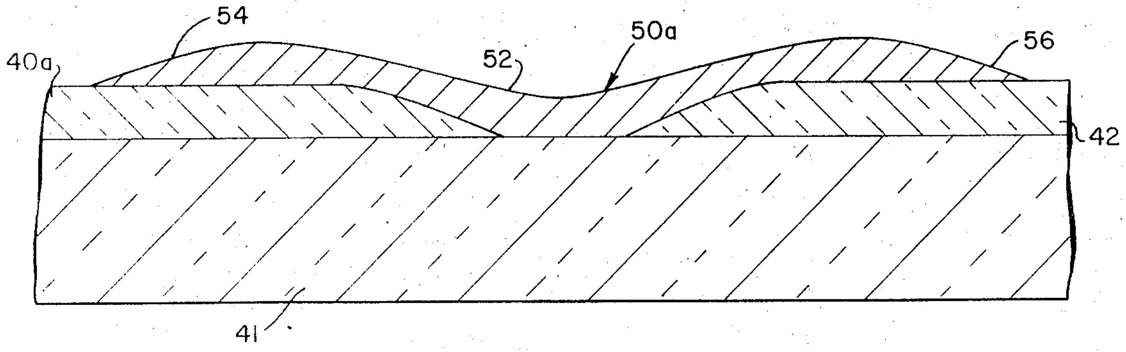
FIG. 5 is a sectional view of a portion of the device of FIG. 4 as taken along line 5—5.

An acoustic surface wave delay line according to a still further embodiment of the invention is illustrated in FIGS. 4–5. The delay line of FIGS. 4–5 is formed on a substrate 41, which may be of ST-cut quartz, for example, although it should be understood that the substrate 41 need not be of acoustic surface wave propagating material. An elongated strip 42 of acoustic surface wave propagating material (such as silica, for example) is disposed on the surface of the substrate 41. The strip 42 functions as the delay medium of the device, and in order to obtain delays of relatively long duration, may be configured in a zig-zag or serpentine pattern as shown. A pair of pads 40*a* and 40*b* of a piezoelectric material (such as ZnO, for example) are disposed on the surface of substrate 41 adjacent the respective ends of the strip 42. Electro-acoustic transducers 46*a* and 46*b* are, in turn, disposed on the respective pads 40*a* and 40*b*.

An acoustic wave-guiding film 50*a*, similar to the film 20 of FIGS. 1–2, is disposed on the surface of substrate 41 between pad 40*a* and the adjacent end of strip 42 and in a manner overlapping respective surface regions of the adjacent end portions of pad 40*a* and strip 42. A similar acoustic wave-guiding film 50*b* is disposed on the region of the substrate surface between pad 40*b* and the other end of strip 42 in a manner overlapping respective surface regions of the adjacent end portions of pad 40*b* and strip 42. As shown in FIG. 5, film 50*a* has a central portion 52 and tapered end portions 54 and 56 corresponding to respective portions 22, 24 and 26 of film 20 of FIGS. 1–2. The construction of the film 50*a* and 50*b* (including film materials and dimensions) may be the same as described above with respect to the film 20.

In the operation of the acoustic delay line of FIGS. 4–5, transducer 46*a* converts input rf signals to acoustic surface waves propagating along the surface of pad 40*a*. Upon reaching wave-guiding film 50*a*, the surface waves launch corresponding acoustic waves in the film 50*a* which propagate via film 50*a* to the adjacent end of delay strip 42. Acoustic surface waves are launched in strip 42 which propagate to the opposite end of the strip 42. Corresponding acoustic waves are transmitted by film 50*b* over to pad 40*b* where they launch acoustic surface waves. Upon reaching transducer 46*b*, these acoustic surface waves are converted into output rf signals.

By utilizing bridge-like film coupling arrangements in accordance with the invention, it may be seen that acoustic surface wave energy may be efficiently transferred from one material to another. Accordingly, in the device of FIGS. 4–5, for example, pads 40*a* and 40*b* may be made of a strong piezoelectric material to enhance conversion of rf energy to acoustic surface waves and vice versa, while the delay line strip 42 may be made of a material which is highly insensitive to temperature. Thus, the present invention enables the realization of composite acoustic surface wave devices wherein different constituent portions may be designed to optimize a different performance parameter.

Although the present invention has been shown and described with reference to particular embodiments, nevertheless, various changes and modifications obvious to a person skilled in the art to which the invention pertains are deemed to lie within the spirit, scope, and contemplation of the invention.

What is claimed is:

1. An acoustic surface wave coupling arrangement comprising:

an element of a material capable of propagating acoustic surface waves and having an acoustic wave propagating surface defining a surface defect therein; and an acoustic wave-guiding film overlying said defect and an adjacent portion of said surface.

2. An acoustic surface wave coupling arrangement according to claim 1 wherein the thickness of said film in the region adjacent said defect is not less than about one-half wavelength of said acoustic surface waves.

3. An acoustic surface wave coupling arrangement according to claim 1 wherein said film has first and second tapered end portions overlying respective portions of said surface near said defect, the thickness of each of said tapered portions decreasing as a function of distance from said defect.

4. An acoustic surface wave coupling arrangement according to claim 3 wherein each of said tapered portions has an extent along the direction of taper not less than about 20 wavelengths of said acoustic surface waves.

5. An acoustic surface wave coupling arrangement comprising:

first and second distinct elements of a material capable of propagating acoustic surface waves disposed adjacent to one another; and an acoustic wave-guiding film overlying a portion of an acoustic wave propagating surface of each of said elements.

6. An acoustic surface wave coupling arrangement according to claim 5 wherein the material of said first element is different from the material of said second element.

7. An acoustic surface wave coupling arrangement comprising:

first and second slabs of a material capable of propagating acoustic surface waves disposed in end-to-end relationship and joined to one another at a common interface; and an acoustic wave-guiding film overlying said interface and an adjacent surface portion of each of said slabs.

8. An acoustic surface wave device comprising:

first and second slabs of a material capable of propagating acoustic surface wave energy disposed in end-to-end relationship and joined to one another at a common interface;

means for launching acoustic surface waves on a surface of said first slab; and an acoustic wave-guiding film overlying said interface and respective adjacent portions of said surface of said first slab and a surface of said second slab.

9. An acoustic surface wave device according to claim 8 wherein the thickness of said film in the region adjacent said interface is not less than about one-half wavelength of said acoustic surface waves.

10. An acoustic surface wave device according to claim 8 wherein said film has first and second tapered end portions overlying respective portions of said first and second slabs, the thickness of each of said tapered portions decreasing as a function of distance from said interface.

11. An acoustic surface wave device according to claim 8 wherein said first slab is of $LiNbO_3$, said second slab is of ST-cut quartz, and said wave-guiding film is of a material selected from the group consisting of gold, aluminum and nickel.

12. An acoustic surface wave device according to claim 10 wherein each of said tapered portions has an extent along the direction of taper not less than about 20 wavelengths of said acoustic surface waves.

13. An acoustic surface wave device comprising:

a substrate;

a first layer of a material capable of propagating acoustic surface waves disposed on said substrate;

a second layer of piezoelectric material disposed on said substrate near said first layer, means for launching acoustic surface waves on a surface of said second layer; and an acoustic wave-guiding film disposed on said substrate and overlying a portion of the surface of each of said first and second layers.

14. An acoustic surface wave delay line comprising:

a substrate;

an elongated strip of a material capable of propagating acoustic surface waves disposed on said substrate;

first and second pads of piezoelectric material disposed on said substrate adjacent respective ends of said strip, an electro-acoustic transducer disposed on each of said pads; and first and second acoustic wave-guiding films disposed on respective regions of said substrate between respective ends of said strip and the adjacent one of said pads, each said film overlying an adjacent portion of the surface of said strip and a portion of the surface of the adjacent one of said pads.

15. An acoustic surface wave delay line according to claim 14 wherein said substrate is of ST-cut quartz, said strip is of silica, said pads are of ZnO, and said wave-guiding films are of a material selected from the group consisting of gold, aluminum and nickel.

* * * * *